United States Patent Office 3,652,500
Patented Mar. 28, 1972

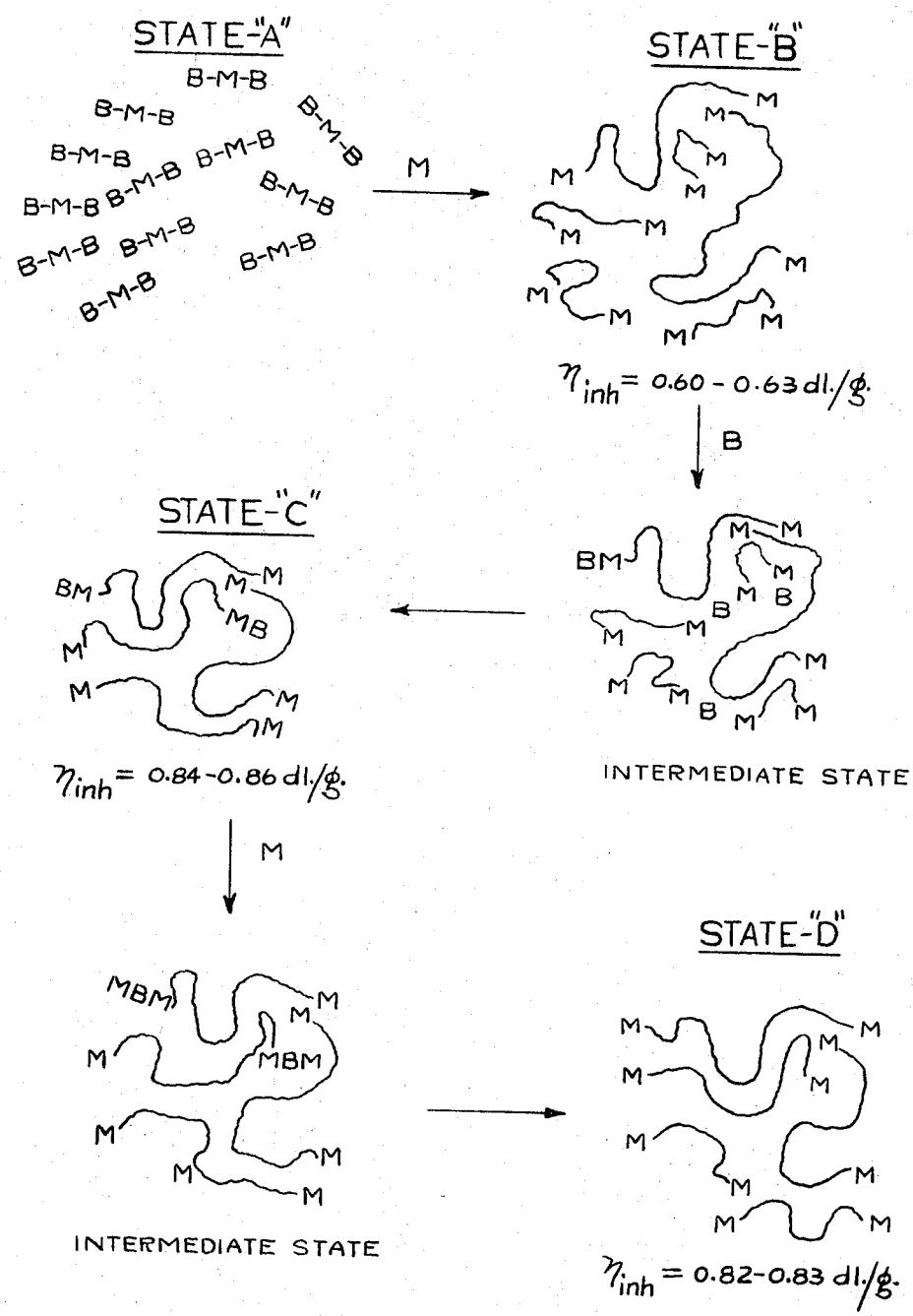

3,652,500
PROCESS FOR PRODUCING POLYAMIDE COATING MATERIALS BY ENDCAPPING
Marvin A. Peterson, Fort Wayne, Ind., assignor to General Electric Company
Filed Aug. 21, 1969, Ser. No. 851,835
Int. Cl. C08g 20/32
U.S. Cl. 260—65
12 Claims

ABSTRACT OF THE DISCLOSURE

I first prepare a polyamide prepolymer using aromatic dianhydride and aromatic diamine starting materials wherein the reactants are in the molar ratio of 2/1 and thereby produce a stable precursor material. There is added to this stable precursor, which may be represented by the formula XYX, or YXY, wherein X represents aromatic dianhydride and Y represents aromatic diamine, a further amount of X or Y in a predetermined molar excess to effect polymerization of the precursors which are "zipped up" to any desirable molecular weight range and thereafter I slowly add either X or Y (depending upon which reactant was used to zip up the precursor) as a back addition. It is noted that the inherent viscosity which is an indicator of molecular weight climbs sharply, and if the X or Y is slowly added to the precursor, the formulator can closely control the molecular weight of the polyorthoamic acid prepolyimide material.

Applying the described procedure it has been found that aromatic carboxylic dianhydride terminated molecules exhibit certain undesirable properties when the prepolyimide materials produced are used as a coating on magnet wire; and therefore, following the described synthesis procedure, and subsequently to the back-titration, I proceed to endcap the molecules by the addition of Y so that all of the molecules are terminated by Y or its equivalent whereby the untoward effect of X terminated molecules will not manifest undesirable reactions when the material is used in producing coatings for magnet wire.

BACKGROUND OF THE INVENTION

By well etabslished experience, it is known that polyimide insulation coatings for magnet wire exhibit many desirable properties including strength, performance at high temperatures, high electrical cut-through resistance, and a considerable degree of dielectric value all of which contribute to their value as insulation coatings.

Polyimide material is obtained as the reaction product of aromatic carboxylic dianhydrides and aromatic diamines. In previously filed copending applications assigned to the same assignee as the present invention, I have demonstrated useful synthesis techniques for obtaining prepolyimide solutions which are water soluble, such teachings are contained in applications entitled, "Improved Process for Producing Coating Materials," U.S. application Ser. No. 803,037, filed Feb. 27, 1969, and "Improved Process for Producing Wire Coatings From Prepolymeric Materials," U.S. Ser. No. 822,899, filed May 8, 1969. In these foregoing applications, I demonstrated the feasibility of closely controlling both the molecular weight of precursor materials for polyimide coatings and controlling the imidization of such material and in a later application there is disclosed a highly useful back titration technique, disclosed in copending application, "Improved Process for Producing Polyamide Coating Materials," U.S. Ser. No. 823,108, filed May 8, 1969. In the aforementioned synthesis techniques, it is important that in the final polymer of polyorthoamic acid represented by $B_pMB_pM_n$ where B is an aromatic carboxylic dianhydride consisting of benzophenonetetracarboxylic dianhydride and M is an aromatic diamine in the form of 4,4'-methylenedianiline, that the terminal portion of the molecule is comprised of M or its equivalent.

As previously mentioned, it is a highly useful technique to form the precursor polyorthoamic acid by combining two moles of B and one mole of M to form the BMB precursor which is "zipped-up" with a 1.6% mole excess of M and then back titrated with an addition of $B_p$ (see U.S. Ser. No. 823,108). It is possible to produce a consistently narrow range of high molecular weight product of $$B_pMB_pM_n$$

but there is some opportunity for certain of the molecules to be terminated by $B_p$, and if such molecules are present in the finished polyimide coating, then the anhydride or acid terminated molecule will detract from many of the useful properties of the polymer.

OBJECTS OF THE INVENTION

The principal object of the present invention is to endcap all of the terminal positions of polyorthoamic acid prepolyimide materials so that they are essentially all amine terminated, by combining with the previously discovered synthesis techniques of back-titration, an addition of aniline or 4,4'-methylene dianiline and to achieve this endcapping without substantially detracting from the molecular weight of the finished product.

The resulting product modified by endcapping exhibits none of the unfavorable properties associated with acid terminated polyimide compounds and essentially I preserve all of the advantages of the aforementioned synthesis techniques for making high molecular weight polyorthoamic precursor coating materials.

It is a further object of the present invention to provide a readily available and easily followed technique for detecting the appropriate amount of reactant beyond which further additions of amine are not necessary for achieving complete endcapping of polyorthoamic acid material derived from the aromatic dianhydride (X) and aromatic diamine (Y) reaction.

Other objects and features of the present invention will become apparent for consideration of the following description which proceeds with reference to the accompanying drawings.

DRAWINGS

The figure illustrates pictorially in states labelled "A," "B," "C" and "D" the synthesis technique whereby using a starting material of $B_pMB_p$ precursor, an excess molar addition of M is first added to state "A" to zip up the precursor and thereby achieve state "B." State "B" is then back-titrated by addition of $B_p$ to achieve state "C"; and the molecules of state "C" are then back-titrated with M to achieve state "D."

GENERAL DESCRIPTION OF THE INVENTION

Prepolyimide insulation coating enamels are produced from the reaction product of aromatic dianhydrides (X) and aromatic diamines (Y) in accordance with the following general over-all reaction.

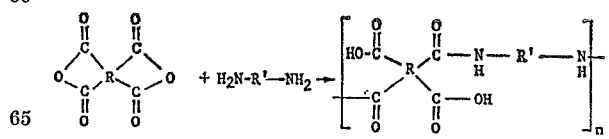

In the procedure for making prepolyimide, I first produce a precursor material of the Formula XYX or YXY using molar ratios of 2/1 to which X or Y is then added in excess amount in the order of about 1.6% molar excess of either X or Y. I then back-titrate to form a molar ratio approaching 1.000/1.000 of the reactants.

In the general reaction described, the XYX or YXY precursor is a stable identifiable material and can be controllably imidized before further polymerization to control the solids/solvent ratio for optimum coating operations. Details for obtaining the XYX or YXY precursor are fully set forth in copending application entitled, "Improved Process for Producing Wire Coatings From Prepolymeric Materials" (supra). After "zip up" of the precursor molecules, I then proceed to add Y or X to the reaction materials to back-titrate until reaching a molar ratio wherein the ratio of precursor to additive approaches 1.000/1.000. In this manner, I can form a reaction product polymer for conventional wire enamel floating die usages which has an inherent viscosity of approximately 0.80–0.83 deciliters per gram. The final molecular product and range are all within the option of the formulator.

Assuming a particular reaction product and specific reactants, the aromatic dianhydride may consist of 3,3', 4,4'-benzophenonetetracarboxylic dianhydride (BPDA) having the formula:

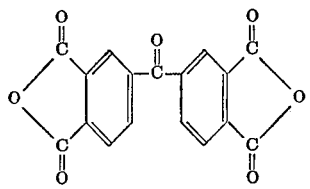

The aromatic diamine may consist of 4,4'-methylenedianiline (MDA) having the formula:

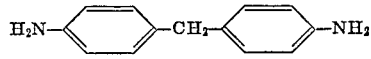

These two materials when combined together in the molar ratio of two parts BPDA and one part MDA will form the precursor $B_pMB_p$ having the formula:

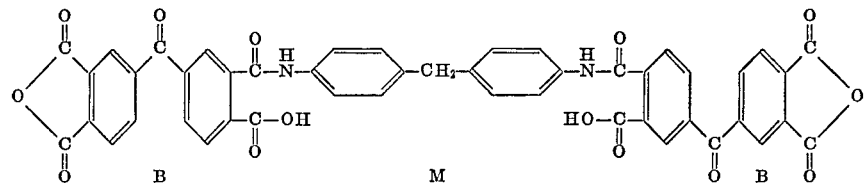

The precursor known as $B_pMB_p$ can be partially imidized prior to "zipping up" the stable precursor units in an environment of dry solvent which may consist of N-methyl-2-pyrolidone under dry nitrogen at temperatures preferably below 50° C. By adding an excess of M the terminal groups are amine terminated and the reaction may be expressed as the following:

$$nB_pMB_p + nM \rightarrow [B_pMB_pM]_n$$

and $$[B_pMB_pM_n]_n + M \rightarrow [B_pMB_pM_n]$$

which may be represented by the formula:

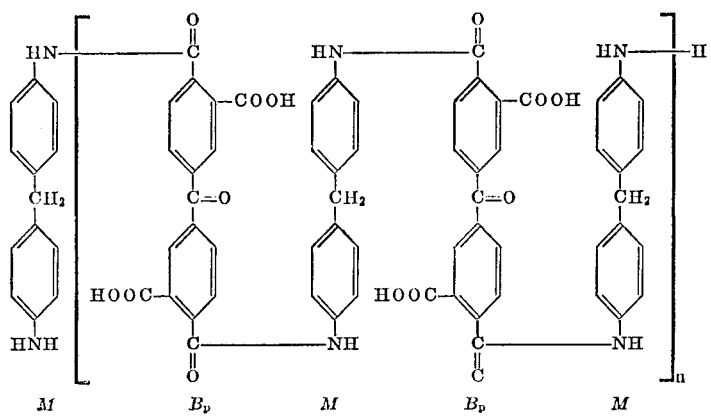

Pictorially, referring to the figure, the reaction commences in a state "A" with $B_pMB_p$ molecules, to which is added a quantity of M with 1.6 percent mole excess diamine which will produce an inherent viscosity of 0.60–0.63 deciliters per gram. State "B" is then converted to state "C" by back-titration with an amount of $B_p$ to approach a molar equality of $B_p$ and M and thereby to achieve an inherent viscosity of 0.75 to 1.1 deciliters per gram. The molecules, however, include orthoacid terminal groups.

At state "B" a polymer is established having a molecular weight range which is desirable and which falls within a very narrow spectrum. The reactivity of the functional terminal group is unchanged with increasing molecular weight, but the mobility of the molecule as a whole is decreased with increasing molecular weight; therefore, statistically it is more probable for a low molecular weight species to react during the back-titration addition of $B_p$ in the transition from state "B" to state "C." At state "B" the molecules are for the most part M terminated, and the relative length of the molecules designates the molecular size and weight. When adding $B_p$ to the state "B" molecules, the inherent viscosity can be controllably increased from approximately 0.60 to any preselected value, e.g. to any desired value between 0.70 and 1.1 deciliters per gram. Since it is more probable for the low molecular weight species to react, there will be produced linkages between small units of M terminated precursors and there is ample evidence that this reaction is preferred, since there is an increase in the average molecular weight of the system in terms of its inherent viscosity and confirmed by number and weight average molecular weight measurements made with gel phase chromatography. Relative speeds of the reactions may be expressed as follows, and it is to be noted that $B_p$ must react twice to be effective in serving as a coupling between two amine terminated molecules. In the following reactions, the first is a fast reaction and the second is relatively slower:

(1)  $M\sim\sim M + B_p \xrightarrow{\text{fast}} M\sim\sim MB_p$ (2)  $M\sim\sim MB_p + M\sim\sim M \xrightarrow{\text{slow}} M\sim\sim MB_pM$ The slower rate for the second reaction is based upon considerations of mobility, and molecular weight. Once a $B_p$ becomes attached to the macromolecule in accordance with the following:

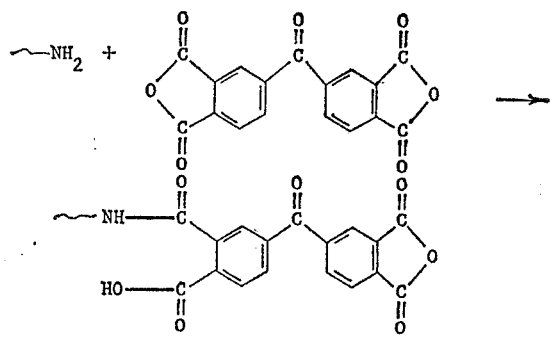

its ability to have the other half (other anhydride) react is considerably reduced because it must either move the entire macromolecule into proximity with another primary amine or have another macromolecule with terminal amine move within distance required for reaction. Since mobile $B_p$ may have its first reaction with an extremely large macromolecule, resulting in a low mobility of the reaction product, the chance of a second reaction occurring becomes remote. In the event that the resulting anhydride terminal of the first reaction is unable to react with another amine terminal grouping within the distance required for a reaction, or if a water molecule opens the anhydride ring, the second reaction will not occur. The reaction of the second anhydride group with water may be expressed as follows:

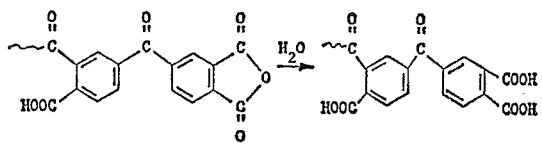

The likelihood of an amine terminated molecule reacting with a dicarboxylic terminated macromolecule is extremely unlikely since the following reaction is relatively slow:

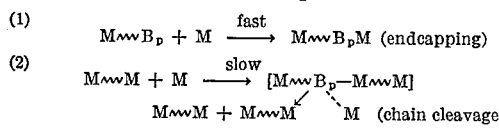

The anhydride group could then be preserved by entrapment or by conversion to the dicarboxylic acid and cause the resulting product to exhibit highly undesirable properties in the ultimate film coating for the magnet wire. The deleterious effect of acids on magnet wire is well known and generally their presence is manifested in the form of an increased brittleness in film and a loss of flexibility. The film is also less resistant to strong bases and loses in its ability to elongate in free standing films in proportion to the occurrence of acid end group occurrence.

Where the terminal portions of the molecules are amine groups there is no loss of elongation with increasing thermal exposure as compared with a substantial reduction of elongation ability with acid terminated molecules.

In the present invention, after back-titration to achieve a 0.84–0.86 deciliter per gram condition of polymerization (state "C" see FIG. 1) the acid terminals are end-capped by the addition of either M or aniline. Two levels are shown in this application to exhibit endcapping: the number of moles of M are equal to the number of moles of $B_p$ added during back-titration; and M is added in the amount of 10 percent of the number of moles of $B_p$ which were employed in the back-titration. There are two competing reactions which are expressed as follows:

(1) $\quad M{\sim}B_p + M \xrightarrow{\text{fast}} M{\sim}B_pM$ (endcapping)

(2) $\quad M{\sim}M + M \xrightarrow{\text{slow}} [M{\sim}B_p{-}M{\sim}M]$ $\qquad M{\sim}M + M{\sim}M \quad$ M (chain cleavage)

Reaction (2) is an interchange reaction between amide groups which occurs in the backbone of the chain of the polyorthoamic acid and two terminal amine molecules will result upon a chain cleavage.

The relatively fast endcapping reaction between a terminal anhydride group and a primary amine would however take place preferentially in accordance with the following:

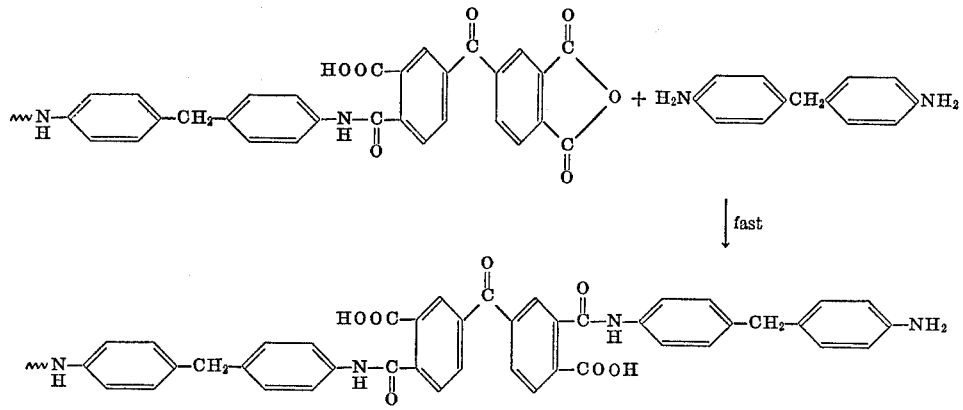

It is only after the anhydride groups are exhausted that the slower chain cleavage reaction will occur between amide groups and the primary amine. There is the slow interchange of amide and amine as follows:

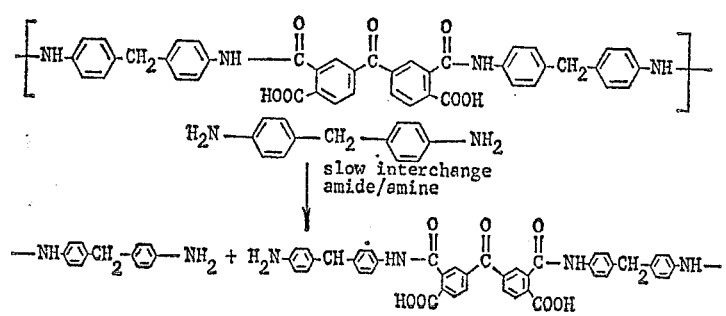

The macromolecule is then split into two parts.

Where aniline is used for encapping there occurs the following reaction which is the fast reaction:

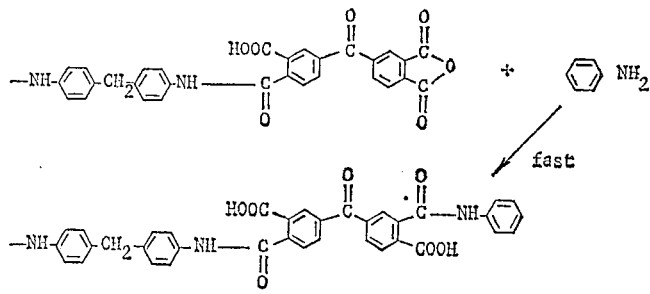

and an interchange of the above macromolecule (amide/amine) by chain cleavage will occur as follows:

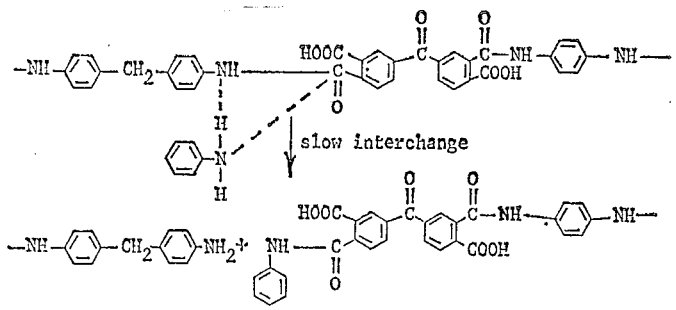

Even though the interchange is an undesirable reaction because of the production of chain cleavage, it is a useful indicator that complete endcapping has occurred since it will only take place once the faster reaction between the amine and the anhydride terminated molecules have completely taken place. On thermoconversion of the endcapped polyorthoamic acid or poly(ammonium orthoamate) to the imide there results when the molecule is endcapped with MDA:

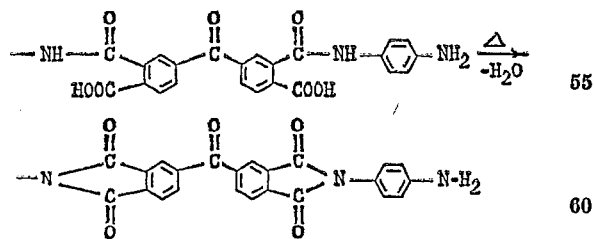

Or, when the endcapping occurs with aniline there results:

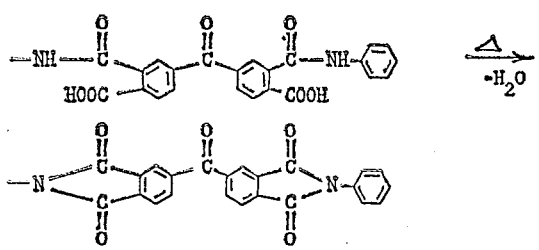

When methylene dianiline is used for endcapping, the normal primary amine appears as the terminal group and when aniline is used for endcapping there is an inert terminal group. In either event the deleterious effects of acid terminated molecules is entirely obviated.

I am not limited to BPDA or MDA as the aromatic dianhydride or aromatic diamine. Other acceptable aromatic dianhydride materials and aromatic diamines will be next described.

Aromatic dianhydride

The aromatic carboxylic dianhydrides that are useful in the process of this invention are those having the formula:

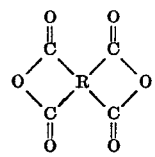

wherein R is a tetravalent radical containing at least one ring of 6 carbon atoms and having benzenoid unsaturation, each pair of carboxyl groups being attached to a different adjacent carbon atom. These dianhydrides include, for example, pyromellitic dianhydride,
2,3,6,7-naphthalenetetracarboxylic dianhydride,
3,3',4,4'-benzophenonetetracarboxylic dianhydride,
benzene-1,2,3,4-tetracarboxylic dianhydride,
bis(3,4-dicarboxyphenyl)sulfone dianhydride,
bis(2,3-dicarboxyphenyl)methane dianhydride,
2,6-dichloronaphthalene-1,4,5,8-tetracarboxylic dianhydride,
2,7-dichloronaphthalene 1,4,5,8-tetracarboxylic dianhydride,
2,3,6,7-tetrachloronaphthalene 1,4,5,8-tetracarboxylic dianhydride,
naphthalene-1,4,5,8-tetracarboxylic dianhydride, naphthalene-1,4,5,8-tetracarboxylic dianhydride,
naphthalene-1,2,4,5-tetracarboxylic dianhydride,
3,3',4,4'-diphenyltetracarboxylic dianhydride,
1,2,5,6-naphthalenetetracarboxylic dianhydride,
2,2',3,3'-diphenyltetracarboxylic dianhydride,
2,2-bis(3,4-dicarboxyphenyl)propane dianhydride,
3,4,9,10-phenylenetetracarboxylic dianhydride,
bis(3,4-dicarboxyphenyl)ether dianhydride,
2,2-bis(2,3-dicarboxyphenyl propane dianhydride,
1,1-bis(2,3-dicarboxyphenyl)ethane dianhydride,
1,1-bis(3,4-dicarboxyphenyl)ethane dianhydride, and the like.

Organic diamine

The organic diamines that are useful in the process of this invention are those having the formula:

$$H_2N—R'—NH_2$$

wherein R' is a divalent radical selected from the class consisting of

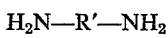

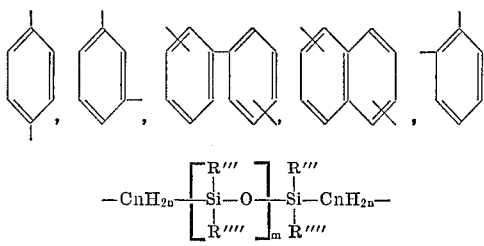

wherein R''' and R'''' are an alkyl or an aryl group having 1 to 6 carbon atoms, $n$ is an integer of from 1 to 4 and $m$ has a value of 0, 1 or more and

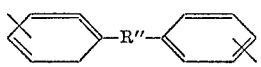

wherein R'' is selected from the group consisting of carbon in an alkylene chain having 1-3 carbon atoms, oxygen, silicon, phosphorous, sulfur, and nitrogen in

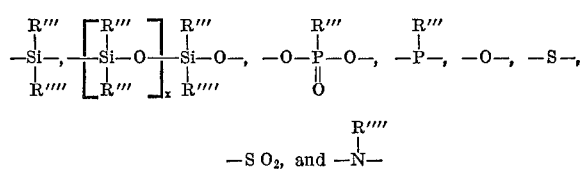

wherein R''' and R'''' are as above-defined and $x$ is an integer of at least 0.

Specific diamines which are suitable for use in the present invention are:

meta-phenylene diamine,
para-phenylenediamine,
4,4'-diamino-diphenyl propane,
4,4'-diamino-diphenyl methane,
benzidine,
4,4'-diamino-diphenyl sulfone,
4,4'-diamino-diphenyl sulfone,
3,3'-diamino-diphenyl sulfone,
4,4'-diamino-diphenyl ether,
2,6-diamino-pyridine,
bis-(4-amino-phenyl) diethyl silane,
bis-(4-amino-phenyl) phosphine oxide,
bis-(4-amino-phenyl)-N-methylamine,
1,5-diamino naphthalene,
3,3'-dimethyl-4,4'-diamino-biphenyl,
3,3'-dimethoxy benzidine,
m-xylylene diamine,
p-xylylene diamine,
1,3-bis-delta-aminobutyltetramethyl disiloxane,
1,3-bis-gamma-aminopropyltetraphenyl disiloxane,
and mixtures thereof.

Solvent addition

The solvents useful in the solution phase of this invention are the organic solvents whose functional groups do not react with either of the reactants (the diamines or the dianhydrides) to any appreciable extent. Besides being inert to the system and preferably, being a solvent for the polyamide acid, the organic solvent must be a solvent for at least one of the reactants, and preferably for both of the reactants. The organic solvent is an organic liquid other than either reactant or homologs of the reactants, that is a solvent for at least one reactant, and contains functional groups, the functional groups being groups other than monofunctional primary and secondary amino groups and other than the monofunctional dicarboxylanhydro groups. Such solvents include dimethysulfoxide, N-methyl-2-pyrrolidone, the normally liquid organic solvents of the N,N-dimethylmethoxyacetamide, N - methylcaprolactam, etc., and tetramethylene urea, pyridine, dimethylsulfone, hexamethylphosphoramide, tetramethylenesulfone, formamide, N-methylformamide, butyrolactane, and N-acetyl-2-pyrrolidone. The solvents can be used alone, as mixtures or in combination with poor solvents such as benzene, toluene, xylene, dioxane, cyclohexane, or benzonitrile.

Ammoniating compounds

The nitrogen containing bases that are useful in the process of this invention include, ammonia ($NH_3$), ammonium hydroxide ($NH_4OH$), ammonium carbonate [$(NH_4)_2CO_3$], and primary and secondary amines containing up to 4 carbon atoms such as methylamine, ethylamine, secondary butylamine, isopropylamine, dimethylamine, diethylamine, dibutylamine, etc.

In order that those skilled in the art may better understand how the invention may be practiced, the following examples are given by way of illustration and not by way of limitation. All parts are parts by weight unless otherwise expressly set forth.

In the following examples it should be understood that the back-titration is with an X or Y depending upon the initial path of reaction thus: XYX is zipped up with Y X or XYX; YXY is zipped up with X and back-titrated with Y or YXY. In any event the resulting back-titrated reaction product is endcapped with Y in order that the terminal groups are non-acid producing and are free of carboxylic terminals. Also in the examples X' and Y' refer to imidized X and Y groups of XYX' and YXY' units; thus XYX' is:

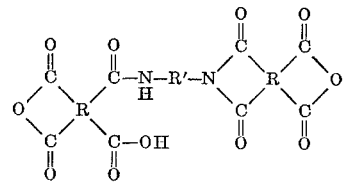

and YXY' is:

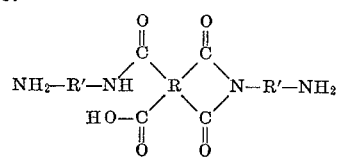

where:
R is a carbocyclic dianhydride, and R' is a difunctional diprimary diamine.

The following examples further exemplify the feature of the invention wherein sufficient amine may be added to effect endcapping and the end point of the reaction is readily determined from the reduction of inherent viscosity which signals that the terminal carboxylic units have all been reacted with —$NH_2$ and further addition of endcapping reagent then serves only in the function of splitting or breaking the larger polymeric units into smaller ones of lower molecular weight; hence the lower inherent viscosity.

EXAMPLE 1

53,170 g. N-methyl-2-pyrrolidone(NAM), <0.02% water, was charged under nitrogen to a reactor equipped with cooling and agitation. Then 6954 g. 3,3',4,4'-benzophenonetetracarboxylic dianhydride (BPDA), 21.6 moles, was charged and stirred for 2 min. Then 2132 g. p,p'-methylene dianiline (MDA), 10.8 moles, was added with stirring over a period of 5 min. and allowed an additional 15 min. of stirring with temperature controlled at 25° C. forming the BMB precursor. Then 2184 g. MDA, 11.0 moles, was added continuously with stirring over a period of 15 min. with temperature controlled at 40° C. max. The resulting polyothoamic acid, polyimide prepolymer, was then at 17.5% solids and had an inherent viscosity of 0.69 dl./g. measured at c.=0.500 g./dl. in NMP at 37.8° C. The percent imidization was found to be 1.8 as determined by titration for the carboxylic acid content in pyridine with tetrabutylammonium hydroxide and thymol blue as the indicator—Sample No. 1. A molecular weight adjustment was then made by the back-titration technique (U.S. 823,108, supra) adding over a period of 5 min. with stirring 92.5 g. BPDA as a solution in 1000 g. NMP, continuously over a period of 5 min. with stirring and under nitrogen and at a temperature max. of 40° C. The resulting polyorthoamic acid was at a solids level of 17.3%, imidization level of 1.8%, and inherent viscosity of 0.83 dl./g.—Sample No. 2. 17,000 g. of the polymer solution was withdrawn from the reactor and 3.03 g. of a carboxyl propyl terminated dimethylsiloxane surfactant was added as a solution in 2045 g. NMP resulting in a polymer system having a solids level of 16.6%, a kinematic viscosity of 3320 cps. at 23.7° C., and a surface tension of 36.5 dynes/cm.—Sample No. 3.

EXAMPLE 2

To 1000 g. of Sample No. 2 of Example 1 was added, under nitrogen and with agitation, 20.0 g. of NMP having less than 0.02% water. This addition was with stirring, dropwise over a period of 5 min. and with temperature controlled at 38±3° C. The stirring was continued at temperature for a period of 15 min. The inherent viscosity of this polymer was 0.82 dl./g. measured at c.=0.500 g./dl. in NMP at 37.8° C. The level of imidization was found to be about 2%.

EXAMPLE 3

To 1000 g. of Sample No. 2 of Example 1 was added, under conditions of Example 2, 0.076 g. of p,p'-methylene dianiline predissolved in 20 g. NMP. The period of heating and stirring was as applied in Example 2. The inherent viscosity of this polymer was 0.79 dl./g. The imidization level was found to be about 2%.

EXAMPLE 4

To 1000 g. of Sample No. 2 of Example 1 was added, under conditions of Example 2, 0.760 g. p,p'-methylene dianiline predissolved in 20 g. NMP. The period of heating and stirring was as applied in Example 2. The inherent viscosity of this polymer was 0.71 dl./g. The level of imidization was at 2.0%.

EXAMPLE 5

A polyorthoamic acid prepared according to the recipe and conditions of Example 1 had an inherent viscosity at the Sample 1 stage of 0.62 dl./g. and after back titration had an inherent viscosity of 0.80 dl./g. at the Sample 2 stage.

EXAMPLE 6

To 1000 g. of Sample No. 2 of Example 5 was added, under conditions of Example 2, 0.036 g. aniline predissolved in 20 g. NMP. The period of heating and stirring was as applied in Example 2. The inherent viscosity of this polymer was 0.76 dl./g. measured at c.=0.500 g./dl. in NMP at 37.8° C. The level of imidization was at about 2.0%.

EXAMPLE 7

To 1000 g. of Sample No. 2 of Example 5 was added, under conditions of Example 2, 0.360 g. aniline predissolved in 20 g. NMP. The period of heating and stirring was as applied in Example 2. The inherent viscosity of this polymer was 0.63 dl./g. The level of imidization was about 2.0%.

EXAMPLE 8

A polyorthoamic acid prepared according to the recipe and conditions of Example 1 had an inherent viscosity at the Sample 1 stage of 0.60 dl./g. measured at c.=0.500 g./dl. in NMP at 37.8° C. The imidization level was at 2.0%. To 7000 g. of this material was added 0.420 g. of a siloxane surfactant predissolved in 220 g. NMP. The surface tension was 37.5 dynes/cm.

EXAMPLE 9

7800 g. of the polyorthoamic acid system of Example 8 was placed in a reactor under nitrogen and equipped with a heating jacket. Then 4.68 g. of BPDA predissolved in 480 g. NMP was added continuously over a period of 5 min. with agitation. Stirring was continued for an additional half hour and the temperature controlled at 38±3° C. The level of imidization was about 2%. The inherent viscosity for the polyorthoamic acid was 0.83 dl./g. measured at c.=0.500 g./dl. in NMP at 37.8° C. To 7000 g. of this material was added 0.420 g. of a siloxane surfactant predissolved in 220 g. NMP. The surface tension was 37.7 dynes/cm.

EXAMPLE 10

7800 g. of the polyorthoamic acid system of Example 8 was treated as Example 9 but with 18.7 g. BPDA predissolved in 480 g. of NMP. The inherent viscosity was found to be 1.1 dl./g. and the level of imidization at about 2.0%. To 7000 g. of this material was added 0.420 g. of a siloxane surfactant predissolved in 220 g. NMP. The surface tension was 37.6 dynes/cm. The polymer systems of Examples 3, 6, 7, 8, 9, and 10 were employed to make free standing films.

The moles of endcapping compound employed in Examples 3 and 6 correspond to 10% of the moles of BPDA employed in the back-titration for the aliquot size of the samples employed in the study. The moles of endcapping compound employed in Examples 4 and 7 correspond to 100% of the moles of aliquot size of the samples employed in the study.

Each solution was cast on tin plate and the wet film exposed 10 min. at 180° C. followed by 5 min. at 210° C. in a forced air oven. The procedure was repeated three times resulting in a 3.5 mil film. The films were removed from the tin plate by amalgamation and treated for an additional 30 min. at 180° C. in a forced air oven. Following this thermal exposure one set of films was subjected to an additional 15 min. at 240° C. and 20 min. at 260° C. A second set was exposed to 5 min. at 240° C. and 30 min. at 275° C. Then the films were cut into 0.250 inch strips and elongation measured inch/inch/min. at 24.5° C. Ten measurements were made for each film. The results are presented in the following table.

| Film from— Example: | Solution inherent, dl./g. | Cure schedule (see above) | Acid term | Ultimate elong., percent |
|---|---|---|---|---|
| 8 | 0.60 | 20 min. at 260° C | No | 22 |
|   | 0.60 | 30 min. at 275° C | No | 26 |
| 9 | 0.83 | 20 min. at 260° C | Few | 24 |
|   | 0.83 | 30 min. at 275° C | Few | 24 |
| 10 | 1.1 | 20 min. at 260° C | Many | 28 |
|   | 1.1 | 30 min. at 275° C | do | 16 |
| 3 | 0.79 | 20 min. at 260° C | E.C. | 24 |
|   | 0.79 | 30 min. at 275° C | E.C. | 27 |
| 6 | 0.76 | 20 min. at 260° C | E.C. | 24 |
|   | 0.76 | 30 min. at 275° C | E.C. | 27 |
| 7 | 0.63 | 20 min. at 260° C | E.C. | 22 |
|   | 0.63 | 30 min. at 275° C | E.C. | 26 |

From the table it is noted that the presence of carboxylic acid terminal groups are detrimental to good film properties resulting in a loss in elongation when tested under conditions of high thermal stress. When the acid terminal groups are endcapped there is no loss in the ultimate elongation values with increasing thermal stress. That this condition of loss in flexibility with increasing carboxylic acid groups is accelerated when the polymer solutions are employed as coatings on copper is a well known state of the art.

While I have emphasized the applicability of my coating process to the production of magnet wire insulation enamels, it will be appreciated that my invention is also useful in many other areas. For example, the films formed in accordance to my invention may find use in all high temperature insulation applications. For example stator and rotor slot insulators, transformers, cable casings, capacitors, and for various laminating processes. In each case the coating process will provide a low-cost, high-class insulator or bonding agent that can be used in place of existing materials. Other potential uses of my coating process of forming water-borne coating solutions with or without minor modifications, will occur to those skilled in the art, and I intend, therefore, in the following claims, to cover all such equivalent variations as fall within the true spirit and scope of this invention.

I claim:

1. A process for producing coating materials for substrates comprising the steps of:
    (a) forming at a temperature below the imidization temperature an anhydrous condensation reaction product of an aromatics carbocyclic dianhydride (X) and an aromatic diprimary, difunctional diamine (Y) wherein the reactants which form the product are in the molar ratio of 2/1 within an organic solvent to yield a solution phase precursor diorthoamic acid of the general formula XYX or YXY in accordance with the molar ratio of aromatic carbocyclic dianhydride and aromatic diamine;
    (b) adding a 1.6 to about 5% excess on a molar ratio basis of Y to the XYX or X to the YXY diorthoamic acid solution system required to effect coupling of substantially all the XYX or YXY precursor diorthoamic acid units;
    (c) thereafter back-titrating with (X) or (Y) whichever is in less molar proportions following step (b) to approach a 1.000/1.000 ratio of aromatic carbocyclic dianhydride and aromatic difunctional diprimary diamine to produce a predetermined molecular weight of reaction product in the solution phase;
    (d) and endcapping the reaction product with a reactant selected from the group consisting of aniline and a difunctional diprimary diamine, to react with carbocyclic anhydride end groups and providing thereby a coherent and adherent coating material.

2. The process in accordance with claim 1 including the step of converting by heat the solution phase diorthoamic acid of XYX or YXY to a partially imidized orthoamic acid imide and thereby to control the viscosity of the coating material before application to a base structure.

3. The process in accordance with claim 1 including the step of subsequently adding to the accompaniment of stirring a nitrogen-containing base to the solution phase of the coupled diorthoamic acid units to preclude the conversion of such coupled units to a gel form and rendering such units water soluble.

4. The process in accordance with claim 1 including the step of carrying out the polymerization of XYX or YXY within an anhydrous organic solvent system having functional groups which are non-reactive with the polymer-forming reactants and is a solvent for at least one of said reactants.

5. A process for producing coating materials on substrates including the steps of: forming at temperatures below the imidization temperature under anhydrous conditions a stable solution of identifiable prepolymeric diorthoamic acid compound units of XYX or YXY of an aromatic carbocyclic dianhydride (X) and a diprimary difunctional diamine (Y) in the ratio of 2/1 of the reactants; zipping up the stable identifiable compound XYX with (Y), or YXY with (X), while maintaining an excess of between about 1.6 and 5.0 mole percent of (Y) or (X); back-titrating with (X) or (Y) to a predetermined molecular weight range; endcapping with (Y) the carbocyclic anhydride end groups of (X) in the zipper up polymer; and applying such coating material to a substrate.

6. A process for producing coating materials for base structures, comprising the steps of:
    (a) forming at a temperature below the imidization temperature the reaction product of an anhydrous aromatic carbocyclic dianhydride (X) and an aromatic difunctional diprimary diamine (Y) wherein the reactants which form the product are in the molar ratio of 2/1 and are in solution within an organic solvent to produce stable identifiable precursor units of XYX or YXY;
    (b) at least partially converting the precursor diorthoamic acid units to orthoamic acid imide units by heating said solution of precursor units;
    (c) adding an excess on a molar ratio basis of XYX or YXY units of from about 1.6 to about 5 percent excess of the non-terminal reactant to effect coupling of the precursor orthoamic acid imide units and thereafter;
    (d) back-titrating with whichever reactant (X) or (Y) is in lesser amount to approach a 1.000/1.000 molar ratio of aromatic carbocyclic dianhydride and aromatic difunctional diprimary diamine to form a preferred molecular weight reaction product;
    (e) and then endcapping the reaction product with an aromatic difunctional diprimary diamine.

7. The process in accordance with claim 6 including the step of adding a nitrogen-containing base to the coupled orthoamic acid imide units to render such material water soluble.

8. The process in accordance with claim 6 wherein the aromatic carbocyclic dianhydride consists of 3,3′,4,4′-benzophenonetetracarboxylic dianhydride and the aromatic difunctional diprimary diamine consists of p,p′-methylenedianiline.

9. The process in accordance with claim 6 including the step of blending with the partially imidized prepolymeric orthoamic acid imide units, a quantity of nonimidized precursor units comprised of the reaction product of aromatic carbocyclic dianhydride (X) and aromatic difunctional diprimary diamine (Y) in the molar ratio of 2/1 parts of such reactants.

10. The process in accordance with claim 6 in which the precursor consists of $B_pMB_p$ and the additional reactant is M and the back-titration reactant is $B_p$.

11. The process in accordance with claim 6 in which the precursor material is $B_pM_p$ and the additive reactant is $MB_pM$ and the back-titration reactant is $B_p$.

12. A process for producing coating materials for substrates comprising the steps of:
    (a) forming within an organic solvent at a temperature below the imidization temperature an anhydrous reaction product of aromatic carbocyclic dianhydride (X) and aromatic difunctional diprimary diamine (Y) wherein the reactants are in the molar ratio of 2/1 and wherein one of the reactants is in an excess on a molar ratio basis of from about 1.6% to about 5 percent;
    (b) heating said anhydrous solution phase reaction product at a temperature that forms precursor orthoamic acid imide units of the general formula XYX′ or YXY′ in accordance with the molar ratio of aromatic carbocyclic dianhydride and aromatic difunctional diprimary diamine;
(c) adding a molar ratio excess of Y or X to the XYX' or YXY' system produced from step (b);
(d) thereafter back-titrating to approach a 1.000/1.000 ratio of aromatic carbocyclic dianhydride (X) and aromatic diamine (Y) to a preferred molecular weight of reaction product;
(e) and endcapping the reaction product of step (d) with aromatic difunctional diprimary diamine.

References Cited

UNITED STATES PATENTS

| | | |
|---|---|---|
| 3,179,614 | 4/1965 | Edwards. |
| 3,179,630 | 4/1965 | Endrey. |
| 3,179,631 | 4/1965 | Endrey. |
| 3,179,632 | 4/1965 | Hendrix. |
| 3,179,633 | 4/1965 | Endrey. |
| 3,179,634 | 4/1965 | Edwards. |
| 3,234,181 | 2/1966 | Olivier _____ 260—78 X |
| 3,242,136 | 3/1966 | Endrey. |
| 3,377,310 | 4/1968 | Serlin et al. |

HOWARD E. SCHAIN, Primary Examiner

U.S. Cl. X.R.

117—128.4, 132 R, 161 P; 260—29.2 N, 47 CP, 78 TF